United States Patent [19]

Kurczyk et al.

[11] 3,712,768

[45] Jan. 23, 1973

[54] PROCESS FOR THE PRODUCTION OF SYNTHETIC INDIALITE

[75] Inventors: Heinz-Georg Kurczyk, Monchengladbach; Josef Wuhrer; Adrian Ottenheym, both of Wulfrath, all of Germany

[73] Assignee: Rheinische Kalksteinwerke GmbH, Wulfrath, Germany

[22] Filed: Oct. 16, 1970

[21] Appl. No.: 81,498

[30] Foreign Application Priority Data

Oct. 14, 1970  Germany ................... P 19 52 572.5

[52] U.S. Cl. ................................................. 423/328
[51] Int. Cl. ...................... C01b 33/26, C04b 35/18
[58] Field of Search ............... 23/315, 110 R; 423/328

[56] References Cited

UNITED STATES PATENTS 2,590,566  3/1952  Osborn ............................. 23/110 R
3,022,180  2/1962  Morrissey et al. ............. 23/110 R X

FOREIGN PATENTS OR APPLICATIONS 487,012  11/1929  Germany ..................... 23/110 R
487,724  12/1929  Germany ..................... 23/110 R
486,218  11/1929  Germany ..................... 23/110 R

*Primary Examiner*—M. Weissman
*Attorney*—Christen & Sabol

[57] ABSTRACT

Synthetic indialite having the general formula $2MgO \cdot 2Al_2O \cdot 5SiO_2$ is produced by heating a mixture of magnesia, kaolin and quartz in the presence of water to a temperature of 170° to 230° C., dehydrating the mixture at a temperature above 850° C., and then firing the dehydrated product at a temperature above 1,100°C.

8 Claims, No Drawings

PROCESS FOR THE PRODUCTION OF SYNTHETIC INDIALITE

The present invention relates to synthetic ceramic materials. More particularly, the present invention relates to a process for the production of synthetic indialite.

The mineral having the overall formula $2MgO \cdot 2Al_2O_3 \cdot 5SiO_2$ occurs in two different crystalline modifications; i.e., either in an orthorhombic system as cordierite or in a hexagonal system as indialite. In the past it was assumed that the crystalline form occurring in ceramic pieces was cordierite, but recently the hexagonal modification has been shown to be present.

Among the few known substances for use as refractory ceramic raw materials which exhibit high resistance to temperature change, silicon carbide and indialite rate particular mention. Products which contain quantities of indialite exhibit long life under changing thermal loads. This is due primarily to the low heat expansion of the indialite. Other minerals which also have low heat expansion include, for example, quartz, lithium-aluminum silicates and aluminum titanate. These materials, however, have not heretofore been accepted to any degree by the art because quartz has a relatively low softening temperature while the other two minerals, compared to indialite, have a higher heat expansion anisotropy.

The formation of refractory masses of indialite has been practiced chiefly with the use of clay-talc of clay-magnesia mixtures as raw materials, with the addition of small amounts of alumina or silicic acid. The formed products are then fired. The formation of indialite has been found to begin only after reaching a temperature of about 1,150° C. This solid material reaction takes place over several intermediate steps. For example, when using talc or kaolinite, a cristobalite phase separates at a temperature of about 1,100° C. When using talc as the basic material, the formation of enstatite will first occur and traces of this mineral will be found up to a firing temperature of about 1,300° C. In addition, forsterite and spinel appear as intermediate phase formations. Also, traces of periclase can be found in ceramic pieces even after very long reaction times. These intermediate phases tend to unfavorably affect the properties of the fired products.

It is therefore an object of the present invention to provide a process for obtaining synthetic indialite of substantial purity.

It is another object of the present invention to provide a well-defined raw material synthetic indialite for use in production of ceramic products which are highly resistant to temperature change.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained by producing synthetic indialite having the general formula of $2MgO \cdot 2Al_2O_3 \cdot 5SiO_2$ from the raw materials magnesia, kaolin and quartz. The raw materials are mixed together in a weight ratio which will provide amounts of $MgO$, $Al_2O_3$ and $SiO_2$ corresponding to the above composition of the desired indialite. The mixture is then hydrothermally heated in the presence of water to a temperature of from 170° to 230° C. and preferably from 180° to 210° C. The product thus obtained is then dehydrated at a temperature above 850° C and then fired to obtain the synthetic indialite. The synthetic indialite of the present invention makes it possible to obtain ceramic products of the desired nature even when employing a short firing cycle at relatively low firing temperatures and without the disadvantage of undesirable intermediate phases in the final product.

The hydrothermal reaction of alkaline earth oxides with silicic acid in the presence of water at temperatures of about 200° C. to form the corresponding hydrosilicates is known. Such a reaction occurs, for example, during hardening of lime sandstone or of so-called porous cement. During the known process, the products to be hardened are heated in pressure chambers with saturated steam. The hydrothermal reaction of the present invention takes place in a similar manner.

As basic materials for the preparation of synthetic indialite according to the present invention, magnesia, kaolin and quartz dust have been found to be particularly suitable. While the particle size of the basic materials is not critical, it has been found suitable to use materials having an average diameter of from 0,0001 mm. to 0,15 mm. and preferably from 0,001 mm. to 0,06 mm. The materials are mixed in a weight ratio of from 1,3 to 1,5 parts of magnesia, from 8,6 to 8,9 parts of kaolin and 1 part of quartz. The mixture is heated in the presence of water and steam, and preferably in a pressure vessel such as an autoclave, at a temperature of from 170° to 210° C., e.g., at 200° C., for from 4 to 12 hours. The amount of water used is from 1,5 to 3 parts by weight based on the weight of the mineral mixture. In a preferred embodiment, the kaolin is preheated to a temperature of about 500° C. before mixing.

The hydrated mixture after the above treatment is dehydrated by heating at a temperature above 850° C., e.g., from 850° to 950° C., for from 1 to 3 hours and then fired at a temperature of from 1,100° C. to 1,300° C. to effect the conversion to indialite. This will occur within a firing time of from 1 to 2 hours.

The following example illustrates a preferred method used for obtaining the synthetic indialite of the present invention. It is to be understood, however, that the example is illustrative only and does not limit the invention in any way.

EXAMPLE 1

A mixture of 1,4 parts by weight of magnesia, 8,7 parts by weight of kaolin and 1 part by weight of quartz dust was heated in an autoclave in the presence of 2,5 parts by weight of water on the weight of the mineral mixture. The heating was continued for 8 hours at a temperature of 200° C. The mixture was then dehydrated at a temperature of 900° C. and then fired at a temperature of 1,200° C. for 2 hours. An X-ray analysis of the final fired product showed that a synthetic indialite of high purity was obtained. The product was substantially white in color and extremely suitable for the manufacture of ceramic products.

What is claimed is:

1. A process for the production of synthetic indialite having the general formula $2MgO \cdot 2Al_2O_3 \cdot 5SiO_2$ which comprises preparing a mineral mixture of magnesia, kaolin and quartz in a weight ratio providing amounts of MgO, $Al_2O_3$ and $SiO_2$ corresponding to said formula, subjecting said mixture to a hydrothermal reaction at a temperature of from 170° to 230° C. dehydrating the mixture at a temperature above 850° C. and then firing the dehydrated product at a temperature above 1,100° C. for from 1 to 2 hours to obtain synthetic indialite.

2. The process according to claim 1 wherein the hydrothermal reaction is carried out at a temperature of 180° to 210° C.

3. The process according to claim 1 wherein the dehydrated product is fired at a temperature of from 1,100° to 1,300° C.

4. The process according to claim 1 wherein the mineral mixture has an average particle diameter of from 0.0001 to 0.15 mm.

5. The process according to claim 1 wherein the minerals are mixed in a weight ratio of 1.3 to 1.5 parts of magnesia and from 8.6 to 8.9 parts of kaolin per part of quartz.

6. The process according to claim 1 wherein the hydrothermal reaction is continued for from 4 to 12 hours.

7. The process according to claim 6 wherein the amount of water used in said hydrothermal reaction is from 1.5 to 3 parts by weight per weight part of said mineral mixture.

8. The process according to claim 1 wherein the mixture is dehydrated for from 1 to 3 hours.

* * * * *